Sept. 9, 1952     G. E. RANDELL     2,610,088
SPRAYING APPARATUS

Filed March 16, 1951     2 SHEETS—SHEET 1

GLENN E. RANDELL
INVENTOR
HUEBNER, BEEHLER,
WORREL & HERZIG
ATTORNEYS

Sept. 9, 1952 G. E. RANDELL 2,610,088
SPRAYING APPARATUS
Filed March 16, 1951
2 SHEETS—SHEET 2

GLENN E. RANDELL
INVENTOR

HUEBNER, BEEHLER,
WORREL & HERZIG
ATTORNEYS

BY Richard M. Worrel

Patented Sept. 9, 1952

2,610,088

UNITED STATES PATENT OFFICE 2,610,088

SPRAYING APPARATUS

Glenn E. Randell, Woodlake, Calif., assignor of one-half to Lawrence H. Lee, Upland, Calif.

Application March 16, 1951, Serial No. 215,883

14 Claims. (Cl. 299—37)

The present invention relates to spraying apparatus and more particularly to such an apparatus having provision for automatic control and direction of spray therefrom over sweeps of predetermined pattern.

The efficient utilization of farmlands frequently requires the spraying of crops with insecticides, fungicides, vitamin solutions, mineral materials and other substances such as hormones to preclude blossom-drop. Such materials are applied in flowable form and consist of liquids, liquids bearing fine particles of solid material, dusts, and gases. As employed herein the term "spray" relates to the projection of any such flowable material whether gas, liquid, or solid for purposes of the application thereof to growing crops and the like.

The efficacy of spraying operations is largely dependent upon the degree of coverage of the growing crops attained by a properly selected material. Inasmuch as spray materials are usually of considerable expense, it is essential that in attaining the desired coverage an absolute minimum of the spray be misdirected and lost. Although manually directed spray application is necessarily expensive because of the labor costs involved, many farmers still adhere to such manual application so as to assure themselves of thorough coverage and minimum waste.

An object of the present invention is to provide an automatic spraying apparatus conducive to increased efficiency in the application of spray materials.

Another object is to provide a spraying apparatus incorporating automatic control and directing means for the projection of spray from the apparatus over sweeps of predetermined patterns.

Another object is to provide an automatic spray capable of achieving more thorough automatic coverage of growing crops and the like with spray materials than attained by conventional spray apparatus.

Another object is to minimize the costs incident to spray application.

Another object is to substitute automatic for manual control in spraying apparatus of acceptable efficiency so that labor incident to spray application is minimized.

Another object is to provide a spraying apparatus characterized by the achieving of maximum coverage with minimum waste.

Another object is to provide automatic control and directing means for spraying apparatus that is adjustable to accurately predetermined patterns of spray movement.

Other objects are to provide improved elements and arrangements thereof in an apparatus of the character and for the purposes set forth.

Further objects and advantages will become apparent in the subsequent description in the specification.

Figure 1:
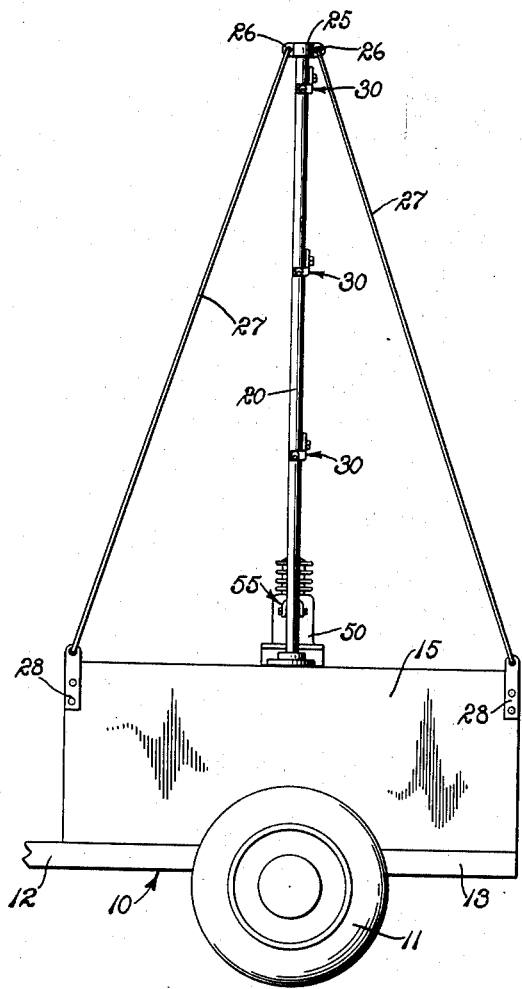
Fig. 1 is a side elevation of a spraying apparatus embodying the principles of the present invention.
Figure 2:
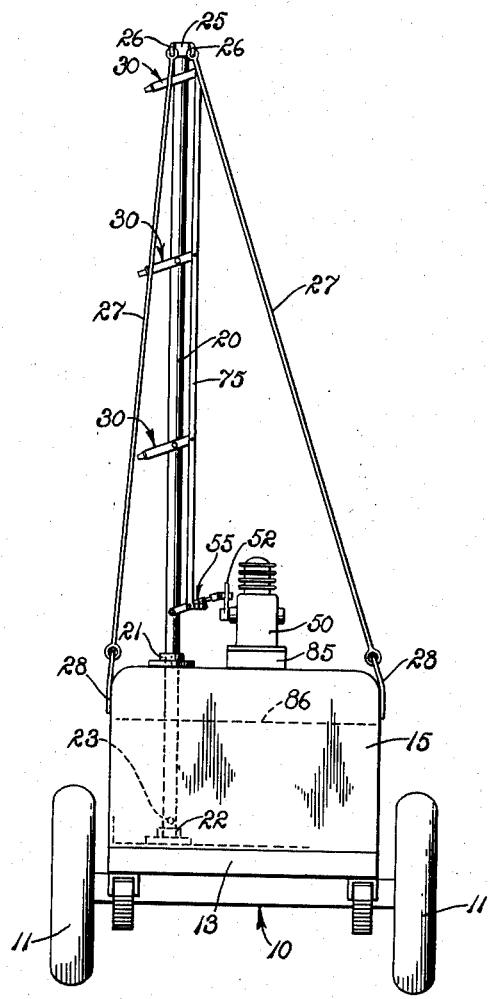
Fig. 2 is a rear end elevation of the apparatus shown in Fig. 1.

Referring in greater detail to the drawings:

Mobile vehicles are exemplified generally by the trailer 10 in Figs. 1 and 2. The trailer provides a pair of support wheels 11, a fragmentarily illustrated tongue 12 and a support frame 13. It is to be understood that the subject invention is not to be limited to employment of a trailer nor any other mobile support, in certain limited instances stationary support is adequate for specialized purposes. In commercial forms of the subject invention, however, mobility is desirable in making possible the spraying of extensive areas and some form of support vehicle is employed.

A spray container 15 is mounted on the trailer 10. It will be obvious that the container can take many forms and in most instances will be of a size in keeping with quantities of spray to be applied between filling operations and of a shape most convenient to the apparatus on which it is supported.

A hollow substantially cylindrical boom 20 is mounted in an erect position on the trailer 10 by a pair of elevationally spaced bearings 21 and 22. The bearing 21 circumscribes the boom and is conveniently mounted on the top of the container 15. The bearing 22 is preferably in cup form and is mounted on the bottom of the container 15. The boom is rotatably extended through the bearing 21 and rested in the bearing 22 within the container 15. The mounting of the boom in the container facilitates direct supply of spray material under pressure to the hollow interior of the boom by simple porting of the boom as at 23 within the container. In many instances the boom is mounted in positions removed from the container in which event spray is supplied from the container to the boom under pressure through suitable conduit means, not shown.

The upper end of the tubular boom 20 is closed by a plug 23 mounted therein and a cap 25 providing radially extended ears 26 is rotatably mounted on the upper end of the boom. Guy cables 27 are secured to the ears 26 of the cap and to brackets 28 mounted on the container 15 or support vehicle in spaced relation to the base of the boom. Although the boom is illustrated and described as mounted in an erect position for rotation about its longitudinal axis, it will be apparent that the boom may be mounted in a horizontal or inclined position, as desired, the significant feature of the present invention not being the erect mounting of the boom but rather the structure providing compound movement of spray nozzle members 30 shown mounted on the boom.

Figure 3:
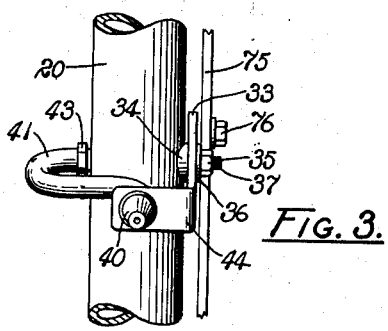
Fig. 3 is a fragmentary side elevation of a supporting boom, nozzle and manipulating structure mounted thereon.
Figure 4:
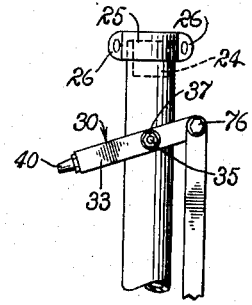
Fig. 4 is a foreshortened rear elevation of the spray boom and associated spray directing structure.
Figure 4:
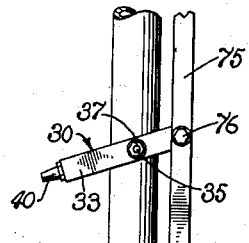
Figure 4:
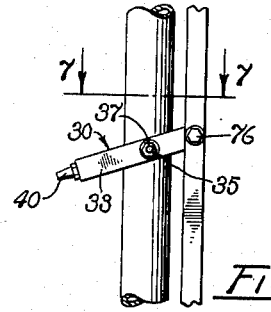
Figure 7:
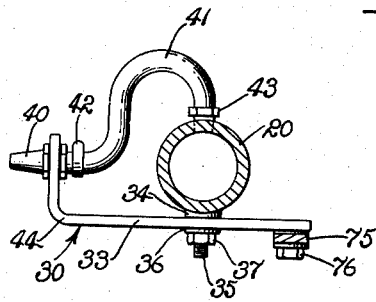
Fig. 7 is a horizontal section through the spray boom taken on line 7—7 of Fig. 4.

As shown in detail in Fig. 7, each nozzle member 30 conveniently takes the form of an elongated arm 33 pivotally mounted on the boom intermediate opposite end portions thereof. For mounting convenience, an annular base 34 individual to each nozzle member and of a shape adapted to fit against the boom 20 is mounted on the boom, as by welding and provides a flat bearing surface laterally disposed from the boom 20. A screw-threaded stud 35 is outwardly extended from the base 34 through the arm 33 and the arm secured thereon for pivotal movement longitudinally of the boom by a washer 36 and screw-threaded nut 37 mounted on the stud. As shown in Figs. 1, 2, and 3, any desired number of arms 33 may be employed on the boom in vertically spaced alignment.

An orifice 40 is mounted on one end of each arm 33 in endwardly extended position and connected to the hollow interior of the boom 20 by means of a flexible hose 41 providing a fitting 42 connected to the orifice and a fitting 43 screw-threadably mounted in the boom. The arm 33 is preferably off-set as at 44 so as to mount the orifice 40 in substantially radial relation to the boom.

A gasoline engine 50 or other prime mover having a substantially horizontal drive shaft 51 is mounted near the base of the boom 20 with the drive shaft in spaced radial relation to the boom. An elongated radius member or eccentric crank 52 having a longitudinal slot 53 formed therein is radially extended from the drive shaft 51.

Figure 5:
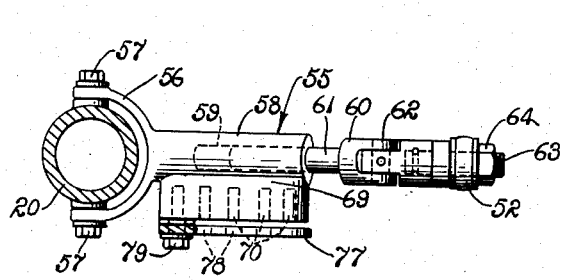
Fig. 5 is a horizontal section taken on line 5—5 of Fig. 4.
Figure 6:
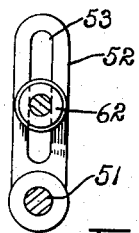
Fig. 6 is a vertical section taken on line 6—6 of Fig. 4.

A manipulating arm 55 having a bifurcated end 56 is pivotally mounted on the boom with the bifurcated end in spanning relation to the boom by a pivot pin 57 extended through the bifurcated end and diametrically through the boom in substantially right angular relation to a line extended from the drive shaft 51 through the center of the boom 20. The arm preferably consists of a female portion 58 having a longitudinal bore 59 formed therein, as shown in Fig. 5, and a male portion 60 having a rod 61 slidably fitted to the bore 59. The extended end of the male portion is provided with a universal joint 62 which is in turn connected to the radius member 52 by the extension of a shaft portion 63 of the universal joint through the slot 53 and retaining the shaft portion in radially adjusted position in the radius member by a nut 64 mounted thereon. It will be clearly apparent that in response to rotation of the shaft 51, the shaft 63 of the universal joint 62 is caused to traverse a circle whose radius is readily adjusted by the selected positioning of the shaft 63 in the radius member 52. It will further be apparent that such rotational movement will cause the manipulating arm 55 to pivot upwardly and downwardly relative to the boom 20 and reciprocally to rotate the boom in its bearings 21 and 22 and cap 25 through distances of travel regulated by the radial positioning of the shaft 63 in the radius member 52.

For purposes soon to become apparent the female portion 58 of the manipulating arm is provided with a longitudinal shoulder 69 evident in Fig. 5 which is extended horizontally from the manipulating arm. The shoulder 69 has a plurality of screw-threaded bores 70 formed transversely of the manipulating arm in alignment longitudinally of the manipulating arm.

An elongated push-pull member 75 is pivotally connected to the ends of the arms 33 opposite from the orifices 40 by pivot bolts 76. The push-pull member assumes a position substantially parallel to the boom 20 and at its lower end has a right angularly extended portion 77 adjacent to the manipulating arm 55 and is provided with a plurality of openings 78 which are alignable with the screw-threaded bores 70 in the shoulder 69 of the manipulating arm. A headed pin 79 is extended through selected juxtapositioned openings 78 and bores 70 and screw-threadably engaged in such selected bores to provide pivotal interconnection of the push-pull member and manipulating arm. It will readily be understood that the pivotal connection of the push-pull member 75 to the manipulating arm 55 attained by the pin 79 translates vertical pivotal movement of the manipulating arm relative to the boom 20 into vertically reciprocal pivotal movement of the nozzle members 30.

*Operation*

The operation of the present invention is believed to be clearly apparent and is briefly summarized at this point. Sufficient pressure is applied to the spray material in the container 15 to force the material upwardly through the boom and outwardly through the orifices 40 by any suitable means. The means for imparting pressure to the spray material, not shown, may be powered from the engine 50 or by any other suitable means. If the spray material is in powder form it will be understood that a container 15 of appropriate form employing agitators to cause the powder to be air-borne is utilized. There being many conventional apparatus for supplying powdered, gaseous or liquid materials to the boom under pressure, such apparatus is not illustrated in detail in the accompanying drawings. For illustrative convenience, the base of the engine 50, indicated at 85 may include an air pump having driven connection with the engine and arranged to supply air from the atmosphere under pressure to the container 15 above the level of a liquid spray material 86 therein to force the spray material through the boom 20 and orifices 40.

Figure 8:
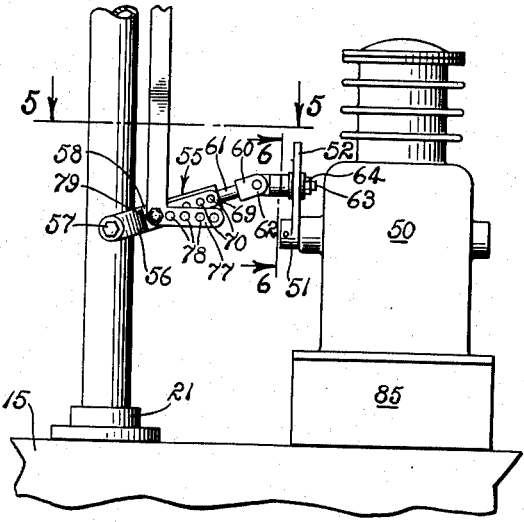
Fig. 8 is a schematic representation of the spray patterns attainable by automatic operation of the apparatus of the present invention exemplifying patterns resulting from typical adjustments.
Figure 8:
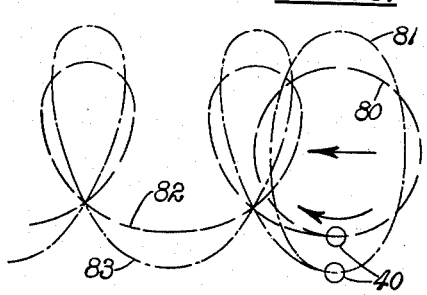

As the drive shaft 51 is rotated by the engine 50, the end of the manipulating arm 55 connected to the radius member 52 is motivated through a circular pattern. The circular movement of the extended end of the manipulating arm oscillates the boom 20 in the bearings 21 and 22 and cap 25 elevationally reciprocates the nozzle members 30 on the boom. When the pin 79 is secured in a bore 70 spaced from the pivot pin 57 a distance equal to the spacing of the pivot bolts 76 from the studs 35, the orifices 40 are caused to traverse a circular path as shown at 80 in Fig. 8. The radius of the circular path is regulated by adjustably locating the shaft 63 of the universal joint 62 in the radius member 52 in radially spaced relation to the drive shaft 51. When a path of orifice movement is desired of an oval form having a major axis longitudinally of the boom 20, the push-pull member 75 and the manipulating arm 55 are pivotally interconnected at greater distances from the boom by the proper location of the pin 79. Such interconnection achieves an orifice travel typified by the path shown at 81 in Fig. 8.

Preconditioned for operation by adjustment of the radial interconnection of the shaft 63 in the radius member 52 and of the pivotal interconnection of the push-pull member 75 to the manipulating arm 55 the trailer 10 or other support vehicle is caused to traverse a path in close proximity to vines, trees, or other objects to be sprayed. Earth-traversing movement of the trailer causes the path of travel of the orifice 80 to assume a progressive wave form shown at 82 and the path of travel 81 to assume a similar progressive wave form of greater magnitude, as shown at 83. Obviously, relative earth traversing speed of the support vehicle and rotational speed of the drive shaft 51 can be regulated as desired.

The adjustability of the automatic spraying apparatus of the present invention permits accurate accommodation of the structure to precise operational requirements. The vertical oscillation in company with the horizontal oscillation is conducive to thorough coverage with a minimum of misdirection of spray material.

The device is economical to produce, dependable in operation, and fully accomplishes the desired functions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an automatic spraying apparatus adapted to spray in a predetermined pattern and having an elongated boom, means rotatably mounting the boom, an elongated push-pull member mounted for longitudinal reciprocal movement adjacent to the boom, and a motor having a drive shaft mounted in substantially radial relation to the boom; a coupling comprising an eccentric crank mounted on the drive shaft, a manipulating arm pivotally connected to the boom for movement about an axis substantially right angularly related to the boom and swivelly connected to the eccentric crank, and means pivotally connecting the push-pull member to the manipulating arm intermediate the boom and the eccentric crank whereby the boom is oscillated and the push-pull member is reciprocated in response to drive shaft rotation.

2. In an automatic spraying apparatus adapted to spray in a predetermined pattern and having a boom, means rotatably mounting the boom, nozzles pivotally mounted on the boom for angular adjustment relative thereto about axes substantially right angularly related to the boom, a push-pull member pivotally interconnecting the nozzles in spaced relation to their respective pivotal axes, and a motor having a drive shaft angularly related to the boom; the combination of an eccentric crank mounted on the drive shaft, a manipulating arm pivotally connected to the boom for pivotal movement relative thereto about an axis substantially right angularly related to the boom and swivelly connected to the eccentric crank, the push-pull member having an angularly related portion extended longitudinally of the manipulating arm, and means pivotally interconnecting the angularly related portion of the push-pull member and the manipulating arm at selected positions in spaced relation to the boom whereby the boom and the nozzles are caused to oscillate about their differential axes.

3. In an automatic spraying apparatus having a boom, means rotatably mounting the boom for oscillation about a substantially vertical axis, and nozzles pivotally mounted on the boom for angular adjustment relative thereto about substantially horizontal axes; the combination of a motor having a drive shaft mounted with the drive shaft substantially radially related to the boom, an eccentric crank mounted on the drive shaft having an elongated slot therein extended outwardly from the shaft, a universal joint mounted in the slot in adjustably spaced relation to the drive shaft, a telescopic manipulating arm connected to the universal joint and having a bifurcated end in spanning relation to the boom, a pivot pin horizontally extended through the bifurcated end of the manipulating arm and the boom, said manipulating arm having a plurality of screw-threaded bores formed transversely therein in spaced alignment longitudinally of the arm, a push-pull member pivotally connected to the nozzles and providing an angularly related portion extended longitudinally adjacent to the manipulating arm having a plurality of bores formed therethrough juxtapositionable with the screw-threaded bores in the manipulating arm, and a screw-threaded pin extended through a selected bore in the push-pull member and engaged in the corresponding bore of the manipulating arm whereby the boom and the nozzles are caused to oscillate about their differential axes.

4. In a spraying apparatus having a nozzle, a device for automatically directing the nozzle in a predetermined pattern comprising means mounted for oscillation and mounting the nozzle thereon for oscillation about an axis transversely of the axis of oscillation of said means, a rotatably driven shaft adjacent to said means, an eccentric means extended from the shaft, an arm having an end pivotally connected to the mounting means for pivotal oscillation relative to said means about an axis transversely of the axis of oscillation thereof and an opposite end swivelly connected to the eccentric means, and a push-pull member pivotally interconnecting the nozzle at a position spaced from its pivotal axis and the arm at a position spaced from its pivotal connection to the mounting means whereby the mounting means and the nozzle are caused to oscillate about their differential axes.

5. In an automatic spraying apparatus adapted to spray in a predetermined pattern, the combination of a rotatably driven shaft, an elongated boom rotatably mounted in spaced angular relation to the driven shaft, a plurality of nozzles mounted transversely on the boom for reciprocal pivotal movement about axes transversely of the boom, an arm pivotally connected to the boom for movement about an axis transversely thereof and extended therefrom adjacent to the driven shaft; a push-pull rod pivotally interconnecting the nozzles and the arm at positions radially spaced from their respective pivotal connections to the boom, an eccentric means mounted on the driven shaft and radially extended therefrom, and a universal joint interconnecting the extended end of the arm and the eccentric means whereby the boom and the nozzles are caused to oscillate about their differential axes.

6. In an automatic spraying apparatus adapted to spray in a predetermined pattern and having an elongated boom, means rotatably mounting the boom, and nozzles pivotally mounted on the boom for angular adjustment relative thereto about axes transversely thereof; the combination of a rotatably driven shaft mounted in angular relation to the boom and having an end disposed adjacent thereto, a crank radially extended from the end of the shaft, an arm pivotally connected to the boom for reciprocal movement about an axis in fixed radial relation to the boom and swivelly connected to the crank in radially spaced relation to the shaft, and a push-pull member pivotally interconnecting the nozzles in spaced relation to their pivotal axes and the arm in spaced relation to its pivotal connection to the boom whereby the boom and the nozzles are caused to oscillate about their respective axes.

7. In a spraying apparatus having a nozzle, a device for automatically directing the nozzle in a predetermined pattern comprising means mounted for oscillation about a substantially vertical axis and mounting the nozzle thereon for vertical oscillation about a substantially horizontal axis, a substantially horizontal rotatably driven shaft adjacent to said means, eccentric means mounted on the shaft, an elongated longitudinally telescopic arm having an end pivotally connected to the mounting means for movement relative thereto about a substantially horizontal axis and an opposite end swivelly connected to the eccentric meas eccentrically of the shaft, and a push-pull member pivotally interconnecting the nozzle at a position spaced from its pivotal axis and the arm at a position spaced from its pivotal connection to the mounting means whereby the mounting means and the nozzle are caused to oscillate about their differential axes.

8. In a spraying apparatus having a nozzle, a device for automatically directing the nozzle in a predetermined pattern comprising means mounted for oscillation and mounting the nozzle thereon for oscillation about an axis substantially transversely thereof, a rotatably driven shaft having an end adjacent to said means, an eccentric crank extended from said shaft, a pivot member transversely extended from the mounting means in fixed radial relation thereto, an arm connected to the pivot member for pivotal oscillation relative to the boom and having an opposite end connected to the eccentric crank, and a push-pull member pivotally interconnecting the nozzle at a position spaced from its pivotal axis and the arm at a position spaced from its pivotal connection to the mounting means whereby the mounting means and the nozzle are oscillated about their differential axes.

9. In an automatic spraying apparatus adapted to spray in a predetermined cycloidal pattern, the combination of support means mounted for earth traversing movement in predetermined direction relative thereto, a rotatably driven shaft mounted on the support means, an elongated boom rotatably mounted on the support means in substantially right angular relation to the shaft adjacent to the shaft, a plurality of nozzles mounted substantially transversely on the boom transversely of the predetermined direction of travel of the support means for reciprocal elevational pivotal movement about axes substantially transversely of the boom, an elongated longitudinally telescopic arm pivotally connected to the boom for movement about an axis transversely thereof and extended therefrom adjacent to the driven shaft, a push-pull rod pivotally interconnecting the nozzles and the arm at positions radially spaced from their respective pivotal connections to the boom, and means mounted on the shaft connecting the extended end of the arm eccentrically to the shaft whereby the boom and nozzles are oscillated about their respective axes in response to shaft rotation.

10. In an automatic spraying apparatus adapted to spray in a predetermined cycloidal pattern, the combination of support means mounted for earth traversing movement in predetermined direction relative thereto, a rotatably driven shaft mounted on the support means, an elongated boom rotatably mounted on the support means in angular relation to the shaft and adjacent to the shaft, a plurality of nozzles mounted substantially transversely on the boom transversely of the predetermined direction of travel of the support means for reciprocal elevational pivotal movement about axes substantially transversely of the boom, a pivot member transversely extended from the boom adjacent to the shaft, an arm pivotally connected to the pivot member for pivotal oscillation relative to the boom and extended therefrom adjacent to the driven shaft, a push-pull member pivotally interconnecting the nozzles and the arm at positions radially spaced from their respective pivotal connections to the boom, an eccentric crank mounted on the driven shaft and radially extended therefrom, and a universal joint interconnecting the extended end of the arm and the eccentric crank eccentrically of the shaft whereby the boom and the nozzles are caused to oscillate about their differential axes.

11. In an automatic spraying apparatus adapted to spray in a predetermined pattern and having a boom, means rotatably mounting the boom in a substantially erect position, and nozzles mounted on the boom in elevationally spaced relation for angular adjustment relative to the boom about substantially parallel horizontal axes; the combination of a rotatably driven shaft mounted in a substantially horizontal position in horizontal spaced relation to the boom, a crank radially extended from the shaft, an elongated longitudinally telescopic arm pivotally connected to the boom for pivotal elevational oscillation relative thereto and having an opposite end swivelly connected to the crank eccentrically of the shaft, and a push-pull member pivotally interconnecting the nozzles in substantially equally spaced relation to the boom and the telescopic arm in spaced relation to its pivotal connection to the boom whereby the boom and nozzles are caused to oscillate about their differential axes.

12. In an automatic spraying apparatus adapted to spray in a predetermined pattern and having a boom, means rotatably mounting the boom in a substantially erect position, and nozzles mounted on the boom in elevationally spaced relation for angular adjustment relative to the boom about substantially parallel horizontal axes; the combination of a rotatably driven shaft mounted in a substantially horizontal position in horizontal spaced relation to the boom, a pivot member transversely extended from the boom in fixed radial relation thereto adjacent to the shaft, a crank radially extended from the shaft, and an elongated arm pivotally connected to the pivot member for substantially vertical oscillation relative to the boom and having an opposite end connected to the crank at a position eccentrically of the shaft, and a push-pull member pivotally interconnecting the nozzles in substantially equally spaced relation to their respective horizontal pivotal axes and to the arm in spaced relation to its connection to the pivot member whereby the boom and the nozzles are caused to oscillate about their differential axes.

13. In an automatic spraying apparatus adapted to spray in a predetermined cycloidal pattern and having a boom, means rotatably mounting the boom for earth traversing movement, nozzles pivotally mounted on the boom for angular adjustment relative thereto about axes substantially right angularly related to the boom, a push-pull member pivotally interconnecting the nozzles in spaced relation to their respective pivotal axes, and a motor having a drive shaft substantially right angularly related to the boom in spaced adjacent relation thereto; the combination of an eccentric crank mounted on the drive shaft, an elongated longitudinally telescopic manipulating arm pivotally connected to the boom for pivotal movement relative thereto about an axis substantially right angularly related to the boom and swivelly connected to the ecentric crank, the push-pull member having an angularly related portion extended longitudinally of the manipulating arm, and means pivotally interconnecting the angularly related portion of the push-pull member and the manipulating arm at selected positions in spaced relation to the boom whereby the boom and the nozzles are caused to oscillate about their differential axes.

14. In an automatic spraying apparatus adapted to spray in a predetermined cycloidal pattern and having a boom, means rotatably mounting the boom for earth traversing movement in a substantially erect position, nozzles pivotally mounted on the boom for angular adjustment relative thereto about substantially horizontal axes, a push-pull member pivotally interconnecting the nozzles in spaced relation to their respective pivotal axes, and a motor having a substantially horizontal drive shaft mounted in spaced adjacent relation to the boom; the combination of an eccentric crank mounted on the drive shaft, a pivot member mounted in fixed radial relation on the boom, a manipulating arm connected to the shaft member for pivotal elevational movement relative to the boom and swivelly connected to the crank eccentrically of the drive shaft of the motor, the push-pull member having an angularly related portion extended longitudinally of the manipulating arm, and means pivotally interconnecting the angularly related portion of the push-pull member and the manipulating arm at selected positions in spaced relation to the boom whereby the boom and the nozzles are caused to oscillate about their differential axes.

GLENN E. RANDELL.

REFERENCES CITED

The following references are of record in the file of this patent:

UNITED STATES PATENTS

| Number | Name | Date |
|---|---|---|
| 2,237,687 | Parsons et al. | Apr. 8, 1941 |
| 2,365,755 | Griffith | Dec. 26, 1944 |